US007710645B2

(12) United States Patent
Lippey (10) Patent No.: US 7,710,645 B2
(45) Date of Patent: May 4, 2010

(54) SELECTIVE REFLECTING FOR LASER PROJECTOR

(75) Inventor: Barret Lippey, Belmont, MA (US)

(73) Assignee: Bose Corporation, Framingham, MA (US)

( * ) Notice: Subject to any disclaimer, the term of this patent is extended or adjusted under 35 U.S.C. 154(b) by 275 days.

(21) Appl. No.: 11/771,692

(22) Filed: Jun. 29, 2007

(65) Prior Publication Data

US 2009/0002816 A1   Jan. 1, 2009

(51) Int. Cl.
*G03B 21/56* (2006.01)
*G03B 21/60* (2006.01)

(52) U.S. Cl. .................. 359/449; 359/459; 359/589
(58) Field of Classification Search ................ 359/443, 359/449, 459, 586, 589
See application file for complete search history.

(56) References Cited

U.S. PATENT DOCUMENTS

| 1,998,054 | A |   | 4/1935 | McBurney |
| 2,590,906 | A |   | 4/1952 | Tripp |
| 3,314,742 | A |   | 4/1967 | Morgan |
| 3,556,640 | A |   | 1/1971 | Austin |
| 3,712,708 | A |   | 1/1973 | Brown |
| 3,942,869 | A |   | 3/1976 | Portner et al. |
| RE29,091 | E |   | 12/1976 | De Palma et al. |
| 4,190,320 | A |   | 2/1980 | Ferro |
| 4,206,969 | A |   | 6/1980 | Cobb |
| 4,979,803 | A |   | 12/1990 | McGuckin et al. |
| 5,148,309 | A |   | 9/1992 | Yamada et al. |
| 5,164,858 | A |   | 11/1992 | Aguilera et al. |
| 5,193,015 | A |   | 3/1993 | Shanks |
| 5,214,530 | A |   | 5/1993 | Coombs et al. |
| 5,257,140 | A | * | 10/1993 | Rogers ...................... 359/884 |
| 5,335,022 | A |   | 8/1994 | Braun et al. |
| 5,361,163 | A |   | 11/1994 | Matsuda et al. |
| 5,383,995 | A |   | 1/1995 | Phillips et al. |
| 5,389,982 | A |   | 2/1995 | Lee |
| 5,400,174 | A |   | 3/1995 | Pagis et al. |
| 5,416,617 | A |   | 5/1995 | Loiseaux |
| 5,473,469 | A |   | 12/1995 | Magocs et al. |
| 5,486,884 | A |   | 1/1996 | De Vaan |
| 5,568,316 | A |   | 10/1996 | Scheck et al. |
| 5,625,494 | A |   | 4/1997 | Fukushima et al. |
| 5,646,781 | A |   | 7/1997 | Johnson, Jr. |
| 5,715,083 | A |   | 2/1998 | Takayama |
| 5,726,805 | A |   | 3/1998 | Kaushik et al. |

(Continued)

FOREIGN PATENT DOCUMENTS

DE          197 47 597        8/1998

(Continued)

OTHER PUBLICATIONS

Shimoda, K., "Multi-Layer Dichroic Coating on Plastic Webs," *Proceedings of Thirteenth International Conference on Vacuum Web Coating*, R. Bakish, Ed., pp. 58-67, Tucson, AZ, Oct. 17-19, 1999.

(Continued)

*Primary Examiner*—Christopher Mahoney (57) ABSTRACT

A projection screen for selectively reflecting light from a front projector. The screen includes an etalon coating structure with a first layer of reflective material, a second layer of dielectric material, and a third layer of partially reflective semiconductor material. The projection screen produces a reflection having an asymmetric-shaped response in the visible spectrum.

9 Claims, 6 Drawing Sheets

U.S. PATENT DOCUMENTS

| | | | |
|---|---|---|---|
| 5,731,898 | A | 3/1998 | Orzi et al. |
| 5,739,296 | A | 4/1998 | Gvon et al. |
| 5,760,954 | A | 6/1998 | Tatsuki et al. |
| 5,768,019 | A | 6/1998 | Niwa et al. |
| 5,832,146 | A | 11/1998 | Bruno |
| 5,875,012 | A | 2/1999 | Crawford et al. |
| 5,880,800 | A | 3/1999 | Mikura et al. |
| 5,914,817 | A | 6/1999 | Browning et al. |
| 6,018,419 | A | 1/2000 | Cobb, Jr. et al. |
| 6,023,369 | A | 2/2000 | Goto |
| 6,031,653 | A | 2/2000 | Wang |
| 6,072,549 | A | 6/2000 | Faris et al. |
| 6,157,486 | A | 12/2000 | Benson et al. |
| 6,208,463 | B1 | 3/2001 | Hansen et al. |
| 6,248,448 | B1 | 6/2001 | Lippey et al. |
| 6,249,378 | B1 | 6/2001 | Shimamura et al. |
| 6,282,023 | B1 | 8/2001 | Bergman |
| 6,284,382 | B1 | 9/2001 | Ishikawa et al. |
| 6,288,172 | B1 | 9/2001 | Goetz et al. |
| 6,288,842 | B1 | 9/2001 | Krasa et al. |
| 6,307,675 | B1 | 10/2001 | Abe et al. |
| 6,317,189 | B1 | 11/2001 | Yuan et al. |
| 6,339,464 | B1 | 1/2002 | Anderson et al. |
| 6,375,330 | B1 | 4/2002 | Mihalakis |
| 6,381,068 | B1 | 4/2002 | Harada et al. |
| 6,392,766 | B1 | 5/2002 | Gnaedig et al. |
| 6,414,727 | B1 | 7/2002 | Benton |
| 6,421,174 | B1 | 7/2002 | Ooshima et al. |
| 6,428,169 | B1 | 8/2002 | Deter et al. |
| 6,449,089 | B1 | 9/2002 | Moshrefzadeh et al. |
| 6,525,877 | B1 | 2/2003 | Clabburn et al. |
| 6,529,322 | B1 | 3/2003 | Jones et al. |
| 6,530,667 | B1 | 3/2003 | Idaszak et al. |
| 6,561,654 | B2 | 5/2003 | Mukawa et al. |
| 6,590,710 | B2 | 7/2003 | Hara et al. |
| 6,618,199 | B2 | 9/2003 | Cook |
| 6,650,455 | B2 | 11/2003 | Miles |
| 6,674,562 | B1 | 1/2004 | Miles |
| 6,680,792 | B2 | 1/2004 | Miles |
| 6,847,483 | B2 | 1/2005 | Lippey et al. |
| 6,894,835 | B2 | 5/2005 | Ohsako et al. |
| 7,035,015 | B2 | 4/2006 | Teijido |
| 7,090,357 | B2 | 8/2006 | Magarill et al. |
| 2001/0011779 | A1 | 8/2001 | Stover |
| 2002/0015215 | A1 | 2/2002 | Miles |
| 2002/0024711 | A1 | 2/2002 | Miles |
| 2002/0063350 | A1 | 5/2002 | Matsumoto |
| 2002/0075555 | A1 | 6/2002 | Miles |
| 2002/0126364 | A1 | 9/2002 | Miles |
| 2002/0130994 | A1 | 9/2002 | Karman |
| 2003/0043157 | A1 | 3/2003 | Miles |
| 2003/0043346 | A1 | 3/2003 | Kwok et al. |
| 2003/0156326 | A1 | 8/2003 | Lotz et al. |
| 2003/0156328 | A1 | 8/2003 | Hiraishi et al. |
| 2003/0214632 | A1 | 11/2003 | Ma et al. |
| 2004/0061935 | A1 | 4/2004 | Ohsako |
| 2004/0196551 | A1 | 10/2004 | Chubachi et al. |
| 2004/0233524 | A1 | 11/2004 | Lippey |
| 2004/0240053 | A1 | 12/2004 | Shimoda |
| 2005/0030480 | A1 | 2/2005 | Lippey |
| 2005/0105176 | A1 | 5/2005 | Lippey |
| 2005/0207002 | A1 | 9/2005 | Liu et al. |
| 2005/0231800 | A1 | 10/2005 | Lippey |
| 2005/0241530 | A1 | 11/2005 | Bruckner et al. |

FOREIGN PATENT DOCUMENTS

| | | |
|---|---|---|
| DE | 4442045 | 8/1998 |
| DE | 19901970 | 8/2000 |
| EP | 0 442 738 A2 | 2/1991 |
| EP | 0 493 863 | 7/1992 |
| EP | 0 648 048 B1 | 10/1994 |
| EP | 0 609 593 B1 | 2/1995 |
| EP | 0 856 768 A | 5/1998 |
| EP | 0 657 769 B1 | 3/2000 |
| EP | 1 324 114 | 7/2003 |
| GB | 511 199 | 8/1939 |
| GB | 652 859 | 5/1951 |
| JP | 62178906 | 8/1987 |
| JP | 05011344 A | 1/1993 |
| JP | 05216123 A | 8/1993 |
| JP | HEI6-289491 | 10/1994 |
| JP | 07 270 915 | 2/1996 |
| JP | 08186849 | 11/1996 |
| JP | H11-119002 | 8/1999 |
| JP | 2000-284908 | 2/2001 |
| JP | 2001 055646 | 6/2001 |
| JP | 2003-50306 A | 2/2003 |
| JP | 2003-121637 A | 4/2003 |
| JP | 2003-337381 A | 11/2003 |
| JP | 2004-029163 A | 1/2004 |
| JP | 2004/038003 | 2/2004 |
| JP | 2004/61545 | 2/2004 |
| JP | 2004-101558 A | 4/2004 |
| JP | 2004-117480 A | 4/2004 |
| JP | 2004-138938 | 5/2004 |
| JP | 2004-144882 | 5/2004 |
| JP | 2004-144883 | 5/2004 |
| JP | 2004163806 | 6/2004 |
| JP | 2004170959 | 6/2004 |
| WO | WO 95/17690 | 6/1995 |
| WO | WO 98/36320 | 8/1998 |
| WO | WO 00/41009 | 7/2000 |
| WO | WO 00/45220 | 8/2000 |
| WO | WO 00/57214 | 9/2000 |
| WO | WO 03/050612 A1 | 6/2003 |
| WO | WO 03/077027 A1 | 9/2003 |
| WO | WO 03/077028 A1 | 9/2003 |
| WO | WO 2004/031852 A1 | 4/2004 |

OTHER PUBLICATIONS

Lotz, H. et al., "Thick Optical Multi-Layer Systems on PET Film," *Precision*, Nov. 2001, as printed from http://www.appliedfilms.com/Precision3/14_multilayer_systems/multilayer_systems_print.htm.

* cited by examiner

| Layer | Material | Thickness (nm) |
|---|---|---|
|  | Substrate |  |
| 1 | Al | 100 |
| 2 | $SiO_2$ | 1622 |
| 3 | $Si_{0.5}Ge_{0.5}$ | 12 |
|  | Diffuser |  |

SELECTIVE REFLECTING FOR LASER PROJECTOR

BACKGROUND OF THE INVENTION

For background, reference is made to U.S. Pat. No. 6,847,483.

SUMMARY OF THE INVENTION

In general, in one aspect, an apparatus for selectively reflecting a beam of light from a front projector. The apparatus includes a projection screen that includes an etalon coating structure. The etalon coating structure includes a first layer, a second layer, and third layer. The second layer is positioned such that it is closer to the projector than the first layer. The third layer is positioned such that it is closer to the projector than the second layer. The first layer includes a generally reflective material. The second layer includes a dielectric material. The third layer includes a generally partially reflective semiconductor material. The projection screen produces a reflection having an asymmetric-shaped response in the visible spectrum.

Implementations may include one or more of the following features. The reflection may have at least two peaks in the visible spectrum. At least one of the peaks may have a faster roll-off on the shorter wavelength side of the peak than on the longer wavelength side of the peak. The third layer may have an index of refraction between 2 and 6. The third layer may have an extinction coefficient between 0.2 and 2. The third layer may have an index of refraction between 3.5 and 5 and an extinction coefficient between 0.4 and 1.5. The third layer may include a mixture of Silicon and Germanium. The third layer may include a mixture of approximately 50% Silicon and 50% Germanium. The third layer may include Selenium. The beam of light may have three spectral peaks with full-width-half-maximum bandwidths of less than 20 nm. The beam of light may have three spectral peaks with full-width-half-maximum bandwidths of less than 10 nm. The beam of light may have at least one spectral peak with a full-width-half-maximum bandwidth of less than 5 nm.

In general, in one aspect, a method of making a selective-reflecting projection screen with an asymmetric-shaped spectral response that includes the steps of depositing a metal layer onto a substrate; depositing one or more dielectric layers onto the metal layer; and depositing a semiconductor layer onto the dielectric layer.

Implementations may include the step of attaching a diffuser to the semiconductor layer.

In general, in one aspect, an optical apparatus includes a front projector and a projection screen for selectively reflecting a beam of light from the front projector. The screen includes an etalon coating structure. The etalon coating structure includes a first layer, a second layer, and third layer. The second layer is positioned such that it is closer to the projector than the first layer. The third layer is positioned such that it is closer to the projector than the second layer. The first layer includes a generally reflective material. The second layer includes a dielectric material. The third layer includes a generally partially reflective semiconductor material. The projection screen produces a reflection having an asymmetric-shaped spectral response in the visible spectrum.

In general, in one aspect, an apparatus for selectively reflecting a beam of light from a front projector includes a projection screen. The projection screen includes a coating structure. The coating structure includes a layer of generally partially reflective semiconductor material. The projection screen produces a reflection having an asymmetric-shaped response in the visible spectrum.

Implementations may include one or more of the following features. The reflection may have at least two peaks in the visible spectrum. At least one of the peaks may have a faster roll-off on the shorter wavelength side of the peak than on the longer wavelength side of the peak.

DETAILED DESCRIPTION

Front projectors produce a video image on a projection screen. Selective-reflecting screens preferentially reflect the wavelength regions of light emitted from the projector and preferably do not reflect some of the wavelength region regions contained in ambient light. This preferential or selective reflection increases the visible contrast of the video image emitted from the projector when viewed in the presence of ambient light.

Projectors form colored images by using wavelength bands to illuminate the screen with red, green, and blue light. For most projectors, the bandwidths of these bands are typically in the range of 20 to 60 nm measured at full-width half maximum (FWHM). Narrow bands may be formed by filtering broad-band light sources such as high intensity discharge lamps or by using narrow-band light sources such as lasers. Narrow bands have a FWHM of less than 20 nm. Typical laser light sources have very narrow peaks that have FWHM bandwidths of approximately 1 to 5 nm. Narrow band light sources are advantageous for improving contrast when used with selective-reflecting screens.

Figure 1:
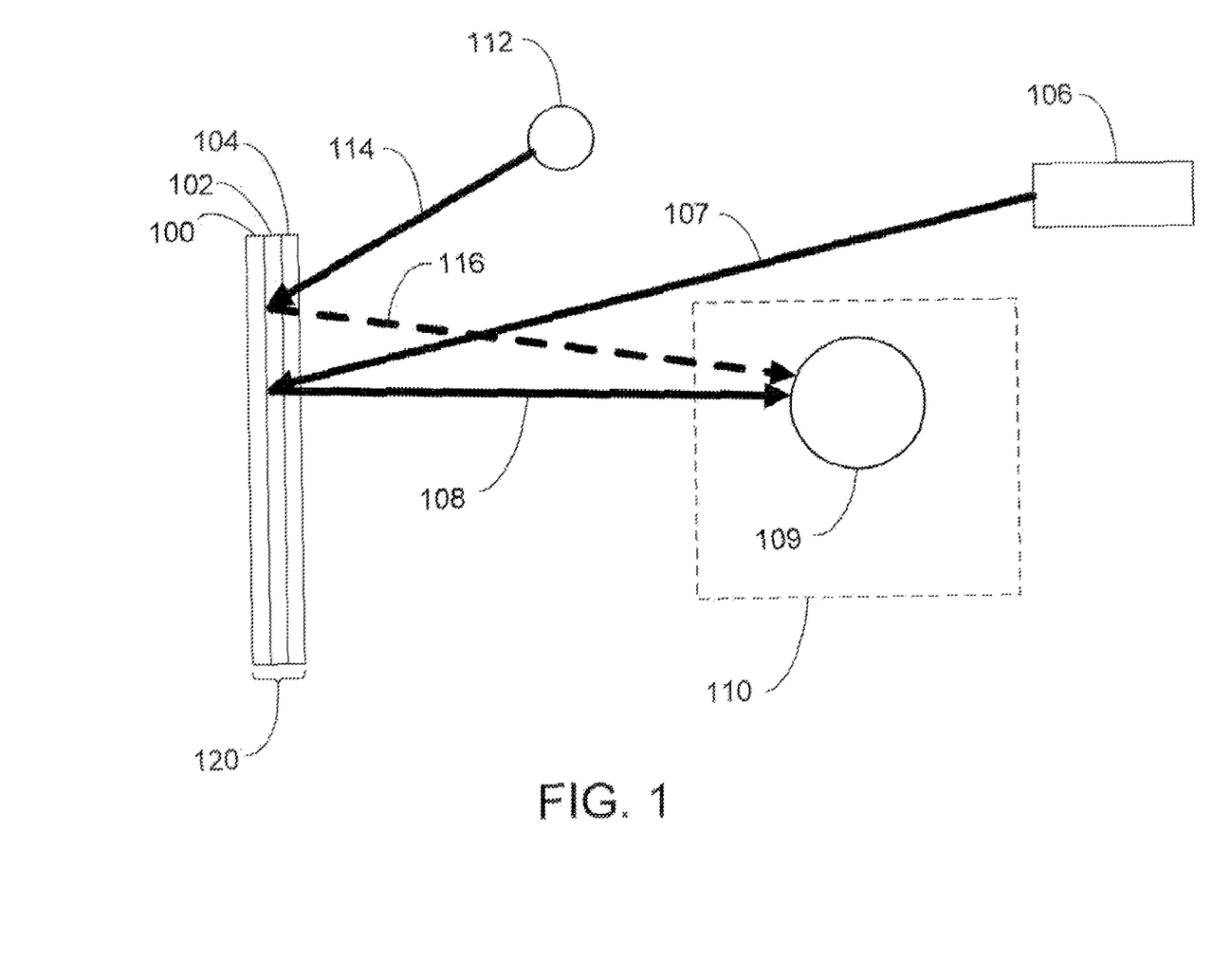
FIG. 1 is a schematic drawing of a selective-reflecting screen.

FIG. 1 shows one implementation of a selective-reflecting screen. In FIG. 1, a viewer is watching an image formed on the selective-reflecting screen. Selective-reflecting screen 120 includes a substrate 100, coating 102, and diffuser 104. Coating 102 is a selective-reflecting coating deposited on substrate 100. Coating 102 generally reflects light have wavelengths corresponding with that produced by projector 106 while generally absorbing light of other wavelengths. Projector 106 forms a projected beam 107 which passes through diffuser 104, reflects strongly from coating 102, passes through diffuser 104 again, forms strong reflected projector beam 108, and is visible to viewer 109 in viewing region 110. Ambient light source 112 forms ambient beam 114 which passes through diffuser 104, reflects weakly from coating 102, passes through diffuser 104 again, forms weak reflected ambient beam 116 (shown by a dashed line), and is not visible or only slightly visible to viewer 109 in viewing region 110.

Figure 2:
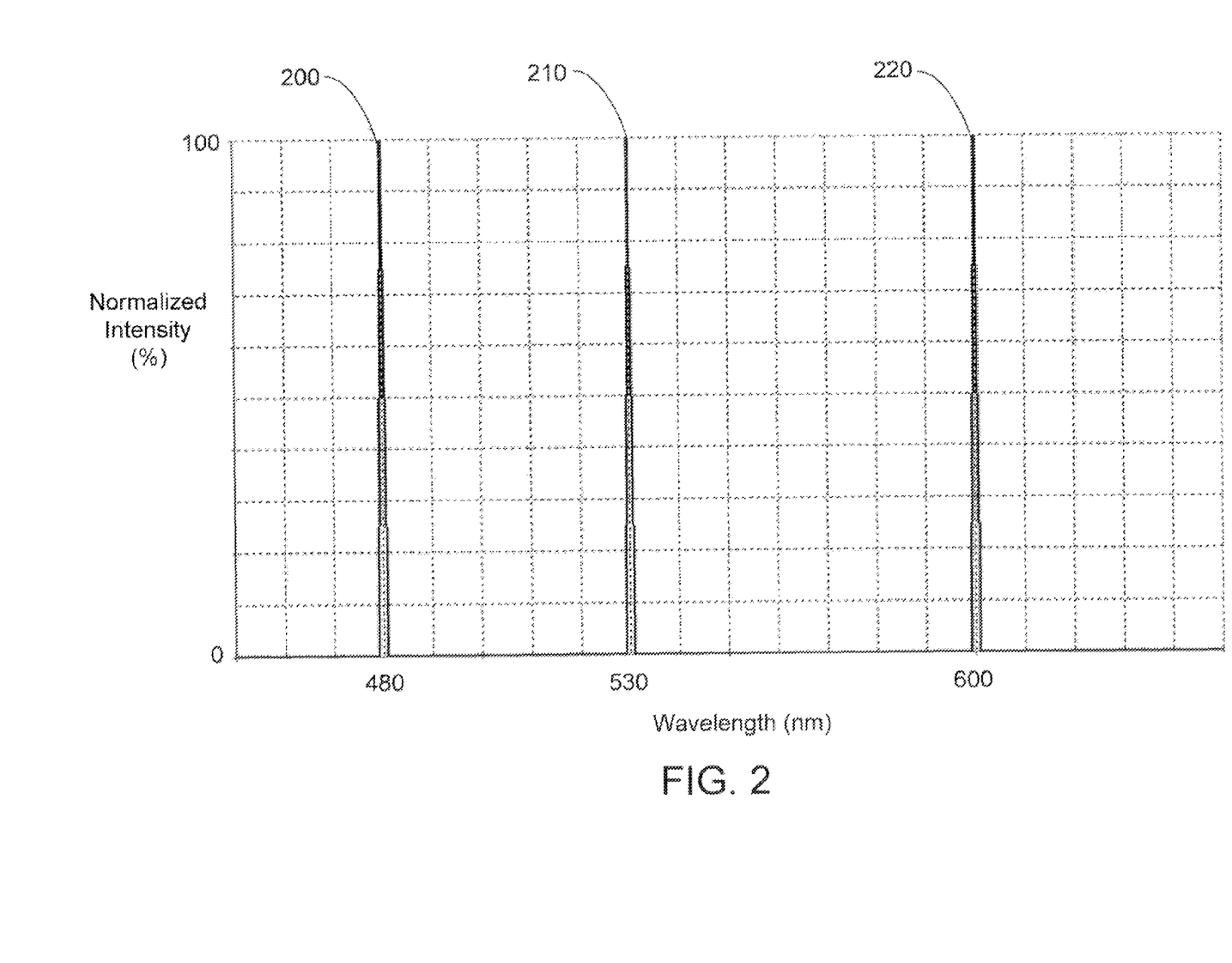
FIG. 2 is a spectral response graph of a laser projector spectrum.

FIG. 2 shows the spectral response curve of one implementation of a laser projector. The spectrum in FIG. 2 has three very narrow peaks at wavelengths of 480 nm, 530 nm, and 600 nm. The bandwidths of the peaks are approximately 1 nm wide. The wavelengths of the laser projector may be varied to fit specific display applications by choosing lasers with desirable wavelengths. Some laser projectors may use multiple peaks from a single laser. Filtered light from a broad-band light source may be used instead of laser sources.

Figure 3:
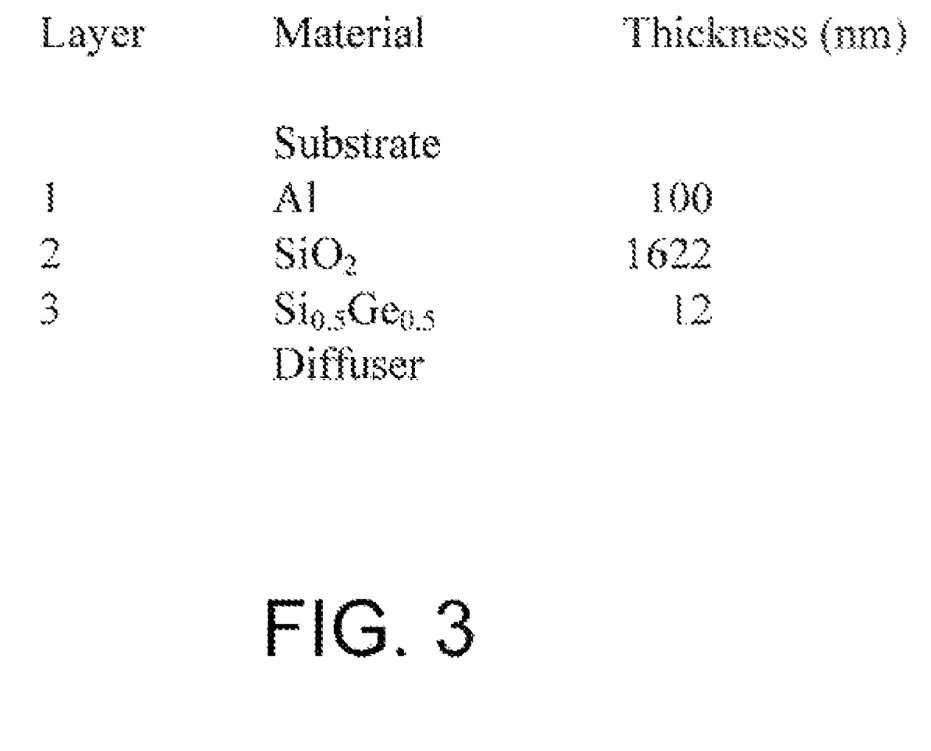
FIG. 3 is a table of an optical design of an interference coating.

FIG. 3 shows one implementation of a selective-reflecting coating design. This design is an etalon interference coating because it has a generally reflective layer (i.e. layer 1, aluminum) at the bottom and a generally partially reflective layer (i.e. layer 3, Si0.5Ge0.5) at the top. Between the reflective layer and the partially reflective layer, there is a spacing layer (i.e. layer 2). In this example, layer 1 is made of aluminum, layer 2 is made of silicon dioxide, and layer 3 is made of 50 mole percent silicon and 50 mole percent of germanium. The material chosen for layer 1 may alternatively be any reflective material, such as silver or niobium. The material chosen for layer 2 may alternately be any dielectric material such as silicon dioxide or niobium pentoxide. The thickness of each layer is chosen to produce selective reflecting at the desired wavelengths and low reflection between the desired wavelengths. Alternatively, other optical designs may be used to achieve the selective-reflecting characteristic. Additional layers may be added between layers 1 and 3 to achieve the desired spectral response curve.

Figure 4:
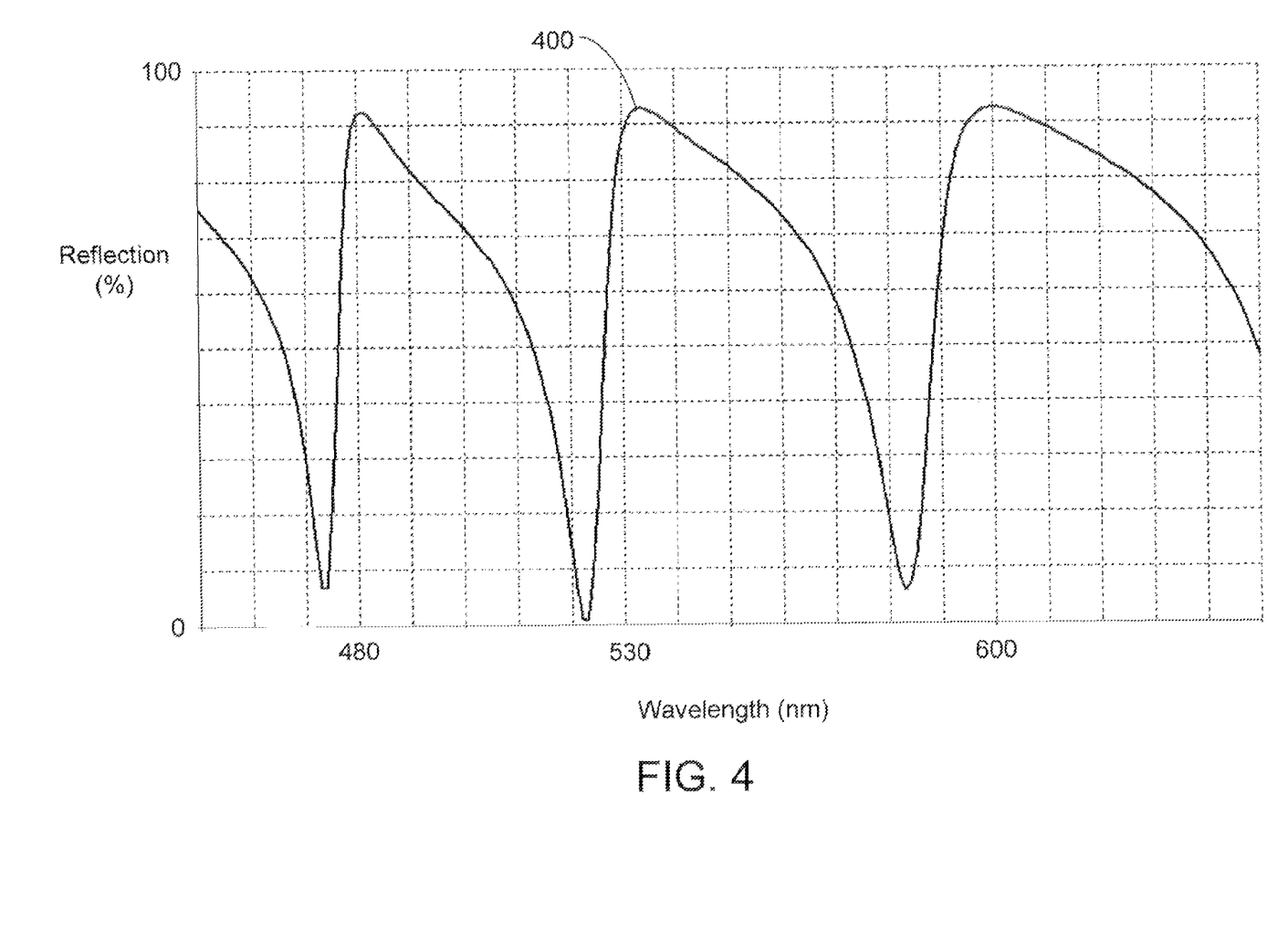
FIG. 4 is a spectral response graph of an interference-coating.

Referring to FIG. 4, curve 400 shows a calculated spectral response of the coating design in FIG. 3 at an angle of incidence equal to zero degrees from the perpendicular. Curve 400 has three main reflection peaks at approximately 481 nm, 534 nm, and 600 nm. These three peaks cover the blue, green, and red colors respectively and can be used in conjunction with a projector having corresponding peaks in its projected beam (such as the laser projector peaks shown in FIG. 2). There are three reflection minimums (or valleys) shown between the peaks. When a projector such as the layer projection of FIG. 2 is projected on a screen made with the coating of FIG. 3, the reflection of the projector is high since the reflection peaks of the screen correspond with the peaks of the projected beam. The reflection of the ambient light is reduced because the ambient light is weakly reflected at wavelengths between the peaks of curve 400. The contrast is the ratio between the reflected projector light and the reflected ambient light. A screen made with the coating of FIG. 3 will thus have improved contrast relative to a conventional white screen when used with a projector having peaks corresponding with the reflection peaks of the screen.

Figure 5:
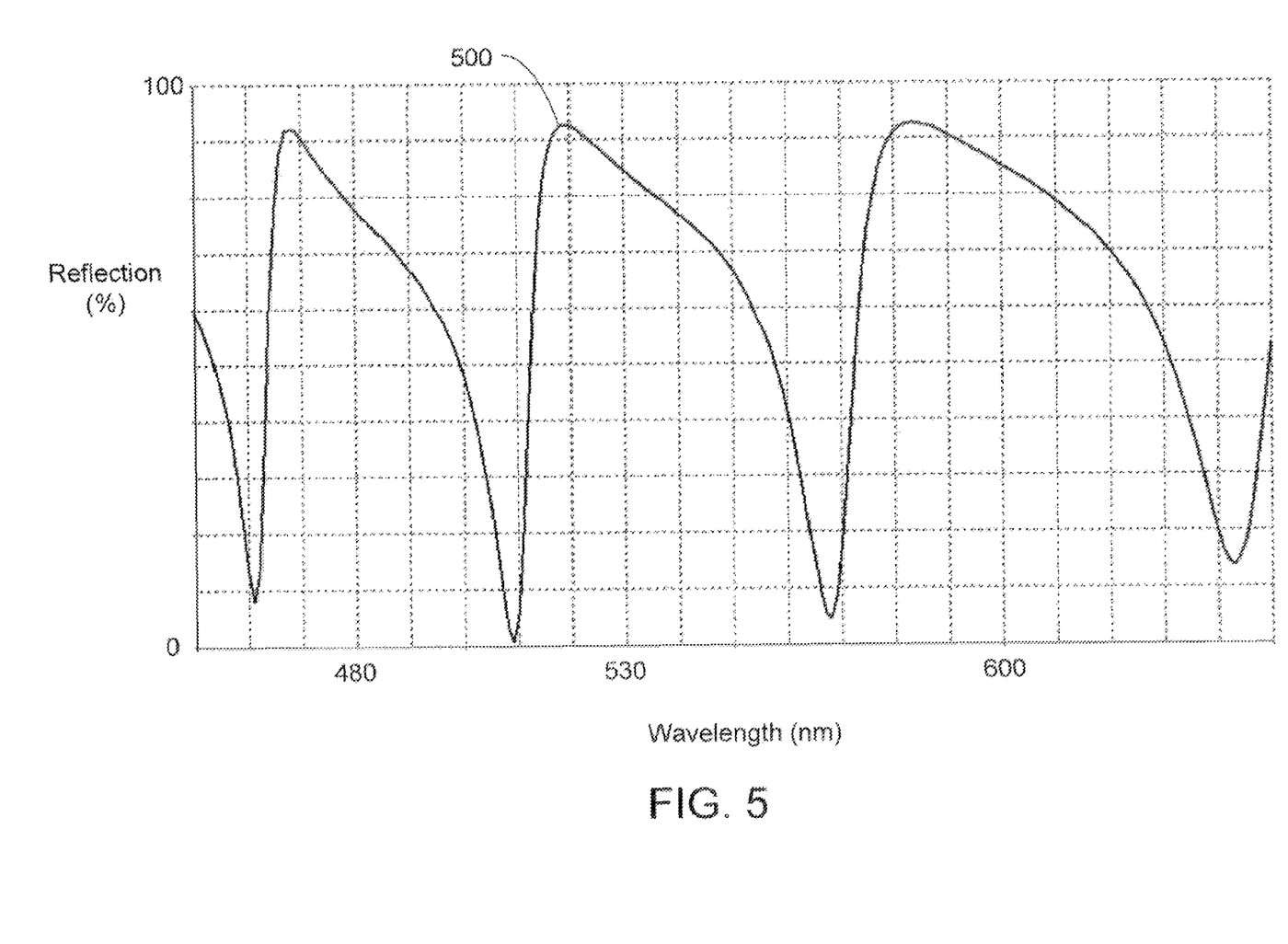
FIG. 5 is a spectral response graph of a shifted interference-coating.

Curve 500 in FIG. 5 shows the calculated spectral response of the coating design in FIG. 3 when the incident light is at an angle of 20 degrees from perpendicular. The reflection peaks have shifted to the left relative to the Curve 400. In Curve 500, the reflection peaks are at approximately 467 nm, 518 nm, and 584 nm. Because each peak of Curves 400 and 500 falls off less sharply on the longer wavelength side of the peak than on the shorter wavelength side of the peak, less ambient light is reflected than from a curve where the peaks fall off less rapidly on both sides of the peak. The asymmetric shape of curves 400 and 500 are also beneficial relative to a symmetric curve with rapid roll off on both sides of the peak, because of how interference coatings shift to the left at non-zero angles of incidence. As can be seen in FIG. 5 where the angle of incidence is 20 degrees, the laser peaks from the projector are still within high reflection regions of Curve 500. If sharp roll-off in reflection occurred on both sides of the peaks, the reflection of the laser projector would be significantly decreased. The reflection of the laser projector wavelengths occurs on the broad sides of the asymmetric peaks. The asymmetric shape thus helps prevent reflection changes due to non-zero angle of incidence. The asymmetric shape is particularly beneficial when the selective-reflecting coating is used with a narrow band projector.

The incident medium for Curves 400 and 500 is diffuser 104 rather than air, so the angle in the incident medium is reduced relative to the angle in air according to the known laws of optical refraction. For example, if diffuser 104 is made of plastic with an index of refraction equal to 1.5, a 20 degree angle in the plastic diffuser corresponds to an actual viewing angle of approximately 31 degrees in air.

The optical properties of materials may be characterized by their index of refraction and their extinction coefficient. For visible wavelengths of light, the index of refraction and extinction coefficient may be considered to be at their average value at 550 nm. At other wavelengths of visible light, the values may vary according to the dispersion of the material. Optical materials may be split into three categories according to their index of refraction and extinction coefficient. The first category is dielectric materials. Dielectric materials are generally transparent in the visible range and have an index of refraction between 1.3 and 3.0. They have an extinction coefficient much smaller than 0.1. The second category is metals. These typically have an index of refraction between 0.1 and 5 and have an extinction coefficient between 2 and 7. Semiconductor materials are the third category. They have highly variable indices of refraction and extinction coefficients. The three categories may also be characterized by their electrical resistivity. Dielectric materials have high resistivity (more than 104 ohm meters), metal material shave low resistivity (less than 10-4 ohm meters), and semiconductor materials have intermediate resistivity (between 10-4 ohm meters and 104 ohm meters).

For the optical design shown in FIG. 3, the material of layer 3 is selected to have an index of refraction between 2 and 6 and an extinction coefficient between 0.2 and 2. This range of index of refraction and extinction coefficient results in the asymmetric shape of the peaks in the spectral curve. The most asymmetric shape is achieved when the index of refraction is between 3.5 and 5 and the extinction coefficient is between 0.4 and 1.5. Materials that satisfy these conditions include mixtures of silicon and germanium, and pure selenium. For example, a mixture of 50 mole percent silicon and 50 mole percent germanium has an index of refraction of 4.5 and an extinction coefficient of 0.5. Pure selenium has an index of refraction of 3.8 and an extinction coefficient of 1.

An advantage of using a semiconductor material rather than a metal in layer 3 is that semiconductor materials may have more stable optical properties than metal materials. The optical properties of many metal materials may be changed by oxidation or reaction with the surrounding layers. Mixtures of silicon and germanium are examples of optically stable semiconductor materials.

Figure 6:
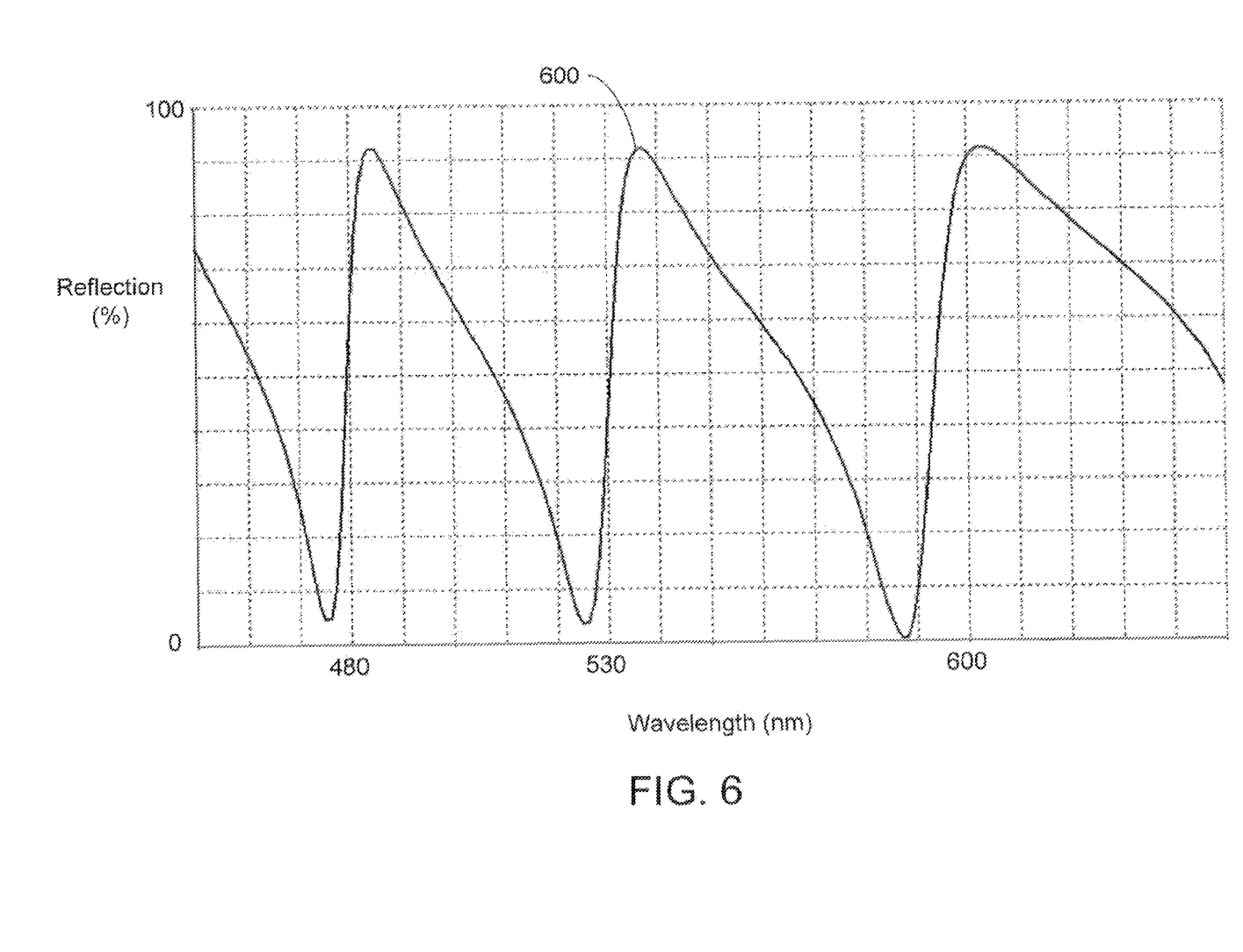
FIG. 6 is a spectral response graph of a coating optimized for high contrast.

Curve 600 in FIG. 6 shows the calculated spectral response of a coating design optimized for high contrast. The same optical design has been used as in FIG. 3 except that the layer 3 shown in FIG. 3 has been replaced by 11 nm of a material with an index of refraction equal to 4.6 and an extinction coefficient equal to 1.2. In this case, the peaks become sharper so that more ambient light is absorbed in the coating. This raises the contrast in the presence of ambient light.

A selective-reflecting projection screen may be manufactured by attaching a diffuser to a selective-reflecting coating. The diffuser may be attached using pressure-sensitive adhesive, UV-cure adhesive, chemically-cured adhesive, or by other means. The selective-reflecting coating may be manufactured by depositing optical layers onto a substrate. The deposition process may be sputtering, physical vapor deposition, or other material deposition method. The substrate may be a plastic film, plastic sheet, or any other object capable of being coated by the deposition process.

Other implementations are also within the scope of the following claims.

What is claimed is:

1. An apparatus for selectively reflecting a beam of light from a front projector, the apparatus comprising:
   a projection screen that includes an etalon coating structure comprising:
   a first layer comprising a generally reflective material;
   a second layer positioned such that it is closer to the projector than the first layer, the second layer comprising a dielectric material; and
   a third layer positioned such that it is closer to the projector than the second layer, the third layer comprising a generally partially reflective semiconductor material;
   wherein the projection screen produces a reflection having asymmetrically-shaped reflective peaks in the visible spectrum, wherein the reflection percentage rolls off from the peaks to a local minimum in less than 20 nm as the wavelengths get shorter and wherein the reflection percentage rolls off from the peaks to a local minimum in greater than 50 nm as the wavelengths get longer.

2. An apparatus in accordance with claim 1, wherein the reflection comprises at least two peaks in the visible spectrum.

3. An apparatus in accordance with claim 1, wherein the third layer has an index of refraction between 2 and 6.

4. An apparatus in accordance with claim 1 wherein the third layer has an extinction coefficient between 0.2 and 2.

5. An apparatus in accordance with claim 1, wherein the third layer has an index of refraction between 3.5 and 5 and an extinction coefficient between 0.4 and 1.5.

6. An apparatus in accordance with claim 1, wherein the third layer comprises a mixture of Silicon and Germanium.

7. An apparatus in accordance with claim 6, wherein the third layer comprises a mixture of approximately 50% Silicon and 50% Germanium.

8. An apparatus in accordance with claim 1, wherein the third layer comprises Selenium.

9. An optical apparatus comprising:
   a front projector;
   a projection screen for selectively reflecting a beam of light from the front projector, the screen including an etalon coating structure comprising:
   a first layer comprising a generally reflective material;
   a second layer positioned such that it is closer to the projector than the first layer, the second layer comprising a dielectric material; and
   a third layer positioned such that it is closer to the projector than the second layer, the third layer comprising a generally partially reflective semiconductor material;
   wherein the projection screen produces a reflection having an asymmetric-shaped spectral response in the visible spectrum, wherein the reflection percentage rolls off from the peaks to a local minimum in less than 20 nm as the wavelengths get shorter and wherein the reflection percentage rolls off from the peaks to a local minimum in greater than 50 nm as the wavelengths get longer, and
   wherein the beam of light has three spectral peaks with full-width-half-maximum bandwidths of less than 20 nm.

* * * * *